US009426308B2

(12) United States Patent
Bank et al.

(10) Patent No.: US 9,426,308 B2
(45) Date of Patent: Aug. 23, 2016

(54) ENABLING MOBILE COMPUTING DEVICES TO TRACK DATA USAGE AMONG MOBILE COMPUTING DEVICES THAT SHARE A DATA PLAN

(71) Applicant: International Business Machines Corporation, Armonk, NY (US)

(72) Inventors: Judith H. Bank, Cary, NC (US); Lisa M. Bradley, Cary, NC (US); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/535,632

(22) Filed: Nov. 7, 2014

(65) Prior Publication Data

US 2016/0134762 A1    May 12, 2016

(51) Int. Cl.
*H04W 4/26* (2009.01)
*H04M 15/00* (2006.01)
*H04W 4/24* (2009.01)

(52) U.S. Cl.
CPC .......... *H04M 15/7652* (2013.01); *H04M 15/59* (2013.01); *H04M 15/887* (2013.01); *H04W 4/24* (2013.01)

(58) Field of Classification Search
CPC ..... H04W 4/24; H04W 4/26; H04M 15/7652; H04M 15/59; H04M 15/887
USPC .......................................... 455/406, 407, 408
See application file for complete search history.

(56) References Cited

U.S. PATENT DOCUMENTS

| 6,965,764 B2 * | 11/2005 | Plush | H04M 15/00 379/111 |
| 2010/0087173 A1 * | 4/2010 | Lin | H04L 12/586 455/412.2 |
| 2010/0144310 A1 * | 6/2010 | Bedingfield, Sr. | H04M 15/58 455/405 |
| 2012/0101952 A1 * | 4/2012 | Raleigh | G06Q 30/016 705/304 |

(Continued)

FOREIGN PATENT DOCUMENTS

WO        2014003750 A1      1/2014

OTHER PUBLICATIONS

List of IBM Patents or Patent Applications Treated as Related, May 18, 2015, pp. 1-2.

(Continued)

*Primary Examiner* — Christopher M Brandt
(74) *Attorney, Agent, or Firm* — Robert A. Voigt, Jr.; Winstead, P.C.

(57) ABSTRACT

A method, system and computer program product for enabling mobile computing devices to track data usage among mobile computing devices that share a data plan. A threshold amount of data to be consumed over a period of time (e.g., billing period) by the mobile computing devices belonging to the shared data plan is received. Upon receiving a message from one of these mobile computing devices that contains an identifier that indicates that the message pertains to data usage information for the shared data plan, the current data usage metrics for the mobile computing device that sent the message is retrieved from the message. The value of the aggregate data usage is updated with the retrieved data usage metrics. Actions, such as throttling the data usage, are performed in response to the aggregate data usage being within a designated amount of data to the threshold amount of data to be consumed.

14 Claims, 5 Drawing Sheets

(56) References Cited

U.S. PATENT DOCUMENTS

| | | | | |
|---|---|---|---|---|
| 2013/0196621 A1* | 8/2013 | Guday | H04W 24/02 | 455/406 |
| 2013/0196626 A1* | 8/2013 | Zalmanovitch | H04W 24/02 | 455/407 |
| 2013/0198373 A1* | 8/2013 | Zalmanovitch | H04W 24/02 | 709/224 |
| 2014/0179266 A1* | 6/2014 | Schultz | H04W 4/24 | 455/406 |
| 2014/0206326 A1* | 7/2014 | Hodges | H04W 4/16 | 455/415 |
| 2014/0378092 A1* | 12/2014 | Bedingfield, Sr. | H04L 12/1417 | 455/405 |

OTHER PUBLICATIONS

Office Action for U.S. Appl. No. 14/715,221, dated Dec. 2, 2015, pp. 1-23.

Office Action for U.S. Appl. No. 14/715,221 dated May 3, 2016, pp. 1-13.

* cited by examiner

ENABLING MOBILE COMPUTING DEVICES TO TRACK DATA USAGE AMONG MOBILE COMPUTING DEVICES THAT SHARE A DATA PLAN

TECHNICAL FIELD

The present invention relates generally to mobile network operators, and more particularly to enabling mobile computing devices to track data usage among mobile computing devices that share a data plan.

BACKGROUND

Mobile network operators (also known as wireless service providers, wireless carriers or mobile network carriers) are a provider of wireless communication services to an end user. In order to obtain revenue from providing wireless communication services, the mobile network operator may charge the end user a fee, such as based on the amount of data consumed or bandwidth used (e.g., $40 for 1 gigabyte of data/month). Oftentimes, the mobile network operator will provide a plan whereby the data can be shared among family members (e.g., spouse, children). For example, the mobile network operator may allow 10 gigabytes of data to be shared among four mobile computing devices (e.g., smartphones) for $100/month. In such a plan, when the allotted 10 gigabytes of data has been used by the mobile computing devices in the shared plan, the mobile network operator charges additional fees. Such fees are undesirable for the end user and should be avoided if possible.

Currently, each user of a mobile computing device may have knowledge of the amount of data that his/her device consumed and be able to "throttle" or reduce the utilization of data by an application(s) running on the user's device thereby attempting to not use more data than allotted.

However, in the shared data plan context, the user may have no knowledge of the amount of data consumed by the other devices in the shared data plan. Hence, another device in the shared data plan could consume an amount of data that would cause the total data allocated across the devices in the shared data plan to exceed the total allotted data, or even consume the entire allocation of the shared data by itself, outside the sphere of knowledge of the other users in the shared data plan.

Some mobile network operators provide the ability for the user to obtain a report regarding the shared data usage. However, such a report does not provide the real-time amount of data used by the devices in the shared data plan. For example, the report may indicate the data usage as of the last business day. Furthermore, in order to access such a report, the user has to log-in to the mobile network operator's website which is time consuming.

Hence, there is not currently a means for the user to have access to real-time data usage among the mobile computing devices that share a data plan in an effortless manner thereby providing an opportunity to avoid unnecessary fees by taking actions to prevent the total allotted data to be used among the mobile computing devices that share a data plan from being exceeded.

BRIEF SUMMARY

In one embodiment of the present invention, a method for enabling computing devices to track data usage among computing devices that share a data plan comprises receiving a threshold amount of data to be consumed by a plurality of devices belonging to the shared data plan. The method further comprises receiving a message from a first device of the plurality of devices belonging to the shared data plan. The method additionally comprises inspecting the message for an identifier that indicates that the message pertains to data usage information for the shared data plan. Furthermore, the method comprises retrieving a set of metrics comprising a current data usage metrics from the message in response to identifying the identifier in the message from the first device. Additionally, the method comprises updating a value of aggregate data usage by the plurality of devices belonging to the shared data plan using the received set of metrics. In addition, the method comprises determining, by the processor, if the value of the aggregate data usage is within a designated amount of data usage to the threshold amount of data to be consumed by the plurality of devices belonging to the shared data plan.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for enabling mobile computing devices to track data usage among mobile computing devices that share a data plan. In one embodiment of the present invention, a threshold amount of data to be consumed over a particular period of time (e.g., a month, billing period) by the mobile computing devices belonging to the shared data plan is received. For example, if the shared data plan is 10 gigabytes of data to be shared among the mobile computing devices for $100/month, then the threshold amount of data to be consumed by the mobile computing devices belonging to the shared data plan would be 10 gigabytes. Upon receiving a message, such as an SMS message, from one of the mobile computing devices that belong to the shared data plan, the message is inspected for an identifier that indicates that the message pertains to data usage information for the shared data plan. Upon identifying such an identifier, a set of metrics is retrieved from the message that includes the current data usage metrics for the mobile computing device that sent the message. The value of the aggregate data usage (the total amount of data used by the mobile computing devices belonging to the shared data plan for a particular period of time) is updated. Actions, such as throttling the data used by applications running on the mobile computing device, are performed in response to the aggregate data usage being within a designated amount of data (e.g., 200 megabytes) to the threshold amount of data (e.g., 2 gigabytes) to be consumed by the mobile computing devices belonging to the shared data plan. In this manner, the user of the mobile computing device will be able to reduce unnecessary fees by taking actions to reduce data usage to ensure that the allotted amount of data to be consumed over a particular period of time (e.g., a month, billing period) by the mobile computing devices belonging to the shared data plan is not exceeded.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
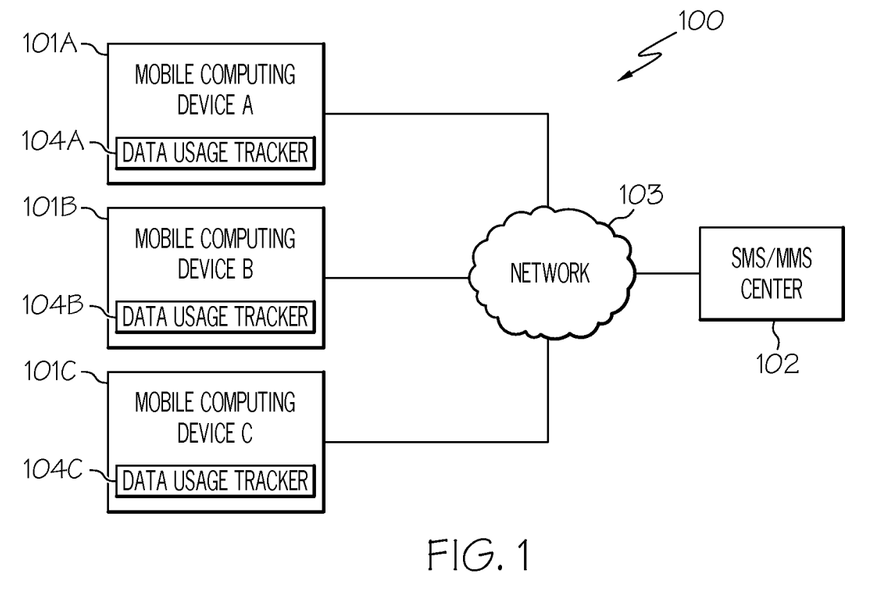
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes mobile computing devices 101A-101C (identified as "Mobile Computing Device A," "Mobile Computing Device B," and "Mobile Computing Device C," respectively, in FIG. 1) connected to a Short Message Service (SMS)/Multimedia Messaging Service (MMS) center 102 via a network 103. Mobile computing devices 101A-101C may collectively or individually be referred to as mobile computing devices 101 or mobile computing device 101, respectively.

Mobile computing device 101 may be any type of computing device (e.g., portable computing unit, Personal Digital Assistant (PDA), smartphone, laptop computer, mobile phone, navigation device, game console, Internet appliance and the like) configured with the capability of connecting to network 102 and consequently communicating with one another. Mobile computing devices 101A-101C may collectively belong to a shared data plan provided by a mobile network operator (provider of wireless communication services to mobile computing devices 101 via network 103), whereby the shared plan involves an amount of data (e.g., 10 gigabytes of data) to be shared among mobile computing devices 101A-101C. While FIG. 1 illustrates three mobile computing devices 101 as belonging to the same shared data plan, any number of mobile computing devices 101 may belong to the same shared data plan. A description of the hardware configuration of mobile computing device 101 is provided below in connection with FIG. 2.

In one embodiment, any user of mobile computing device 101 may be able to send and receive text messages, such as Short Message Services (SMS) messages or Multimedia Messaging Services (MMS) messages. While the following discusses the present invention in connection with using text messages, the principles of the present invention may be applied to other types of messages, such as instant messages. A person of ordinary skill in the art would be capable of applying the principles of the present invention to such implementations. Further, embodiments applying the principles of the present invention to such implementations would fall within the scope of the present invention.

Network 103 may be, for example, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, each mobile computing device 101A-101C includes a software agent, referred to herein as the "data usage tracker" 104A-104C, respectively, configured to track data usage among mobile computing devices 101 that share a data plan as discussed further below. Data usage trackers 104A-104C may collectively or individually be referred to as data usage trackers 104 or data usage tracker 104, respectively. In one embodiment, data usage tracker 104 is located at the operating system level of computing device 101.

As discussed above, system 100 includes an SMS/MMS center 102. SMS/MMS center 102 is configured to relay, store and forward text messages, such as SMS messages, and/or messages with multimedia content, such as MMS messages, among mobile computing devices 101 through network 103.

System 100 is not to be limited in scope to any one particular network architecture. System 100 may include any number of mobile computing devices 101, SMS/MMS centers 102 and networks 103.

Figure 2:
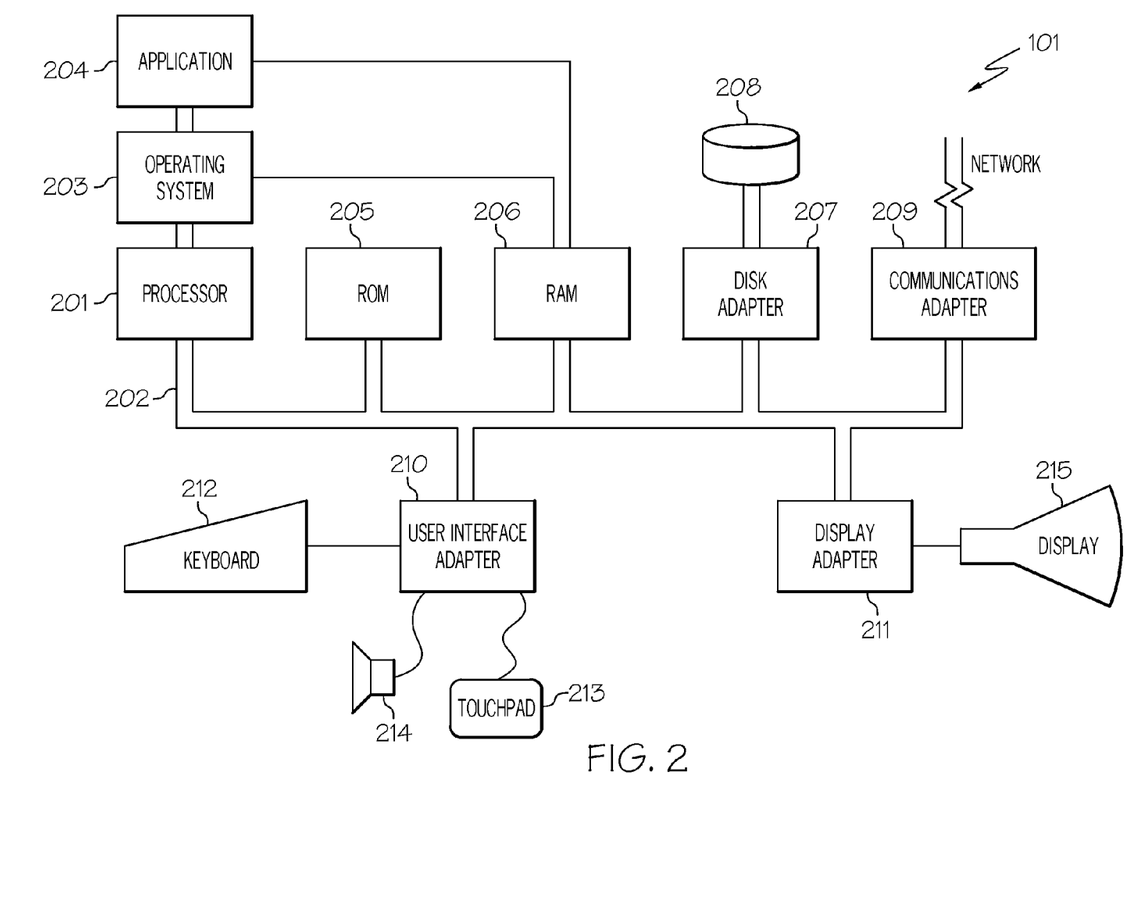
FIG. 2 illustrates a hardware configuration of a mobile computing device for practicing the principles of the present invention in accordance with an embodiment of the present invention.

Referring now to FIG. 2, FIG. 2 illustrates a hardware configuration of mobile computing device 101 (FIG. 1) which is representative of a hardware environment for practicing the present invention. Referring to FIG. 2, mobile computing device 101 has a processor 201 coupled to various other components by system bus 202. An operating system 203 runs on processor 201 and provides control and coordinates the functions of the various components of FIG. 2. Operating system 203 may include, for example, data usage tracker 104 for tracking data usage among mobile computing devices 101 that share a data plan as discussed further below in connection with FIGS. 3A-3B and 4. An application 204 in accordance with the principles of the present invention runs in conjunction with operating system 203 and provides calls to operating system 203 where the calls implement the various functions or services to be performed by application 204.

Referring again to FIG. 2, read-only memory ("ROM") 205 is coupled to system bus 202 and includes a basic input/output system ("BIOS") that controls certain basic functions of mobile computing device 101. Random access memory ("RAM") 206 and disk adapter 207 are also coupled to system bus 202. It should be noted that software components including operating system 203 and application 204 may be loaded into RAM 206, which may be mobile computing device's 101 main memory for execution. Disk adapter 207 may be an integrated drive electronics ("IDE") adapter that communicates with a disk unit 208, e.g., disk drive.

Mobile computing device 101 may further include a communications adapter 209 coupled to bus 202. Communications adapter 209 interconnects bus 202 with an outside network (e.g., network 103 of FIG. 1) thereby enabling mobile computing device 101 to communicate with other mobile computing devices 101 and SMS/MMS center 102.

I/O devices may also be connected to mobile computing device 101 via a user interface adapter 210 and a display adapter 211. Keyboard 212, touchpad 213 and speaker 214 may all be interconnected to bus 202 through user interface adapter 210. A display monitor 215 may be connected to system bus 202 by display adapter 211. In this manner, a user is capable of inputting to mobile computing device 101 through keyboard 212 or touchpad 213 and receiving output from mobile computing device 101 via display 215 or speaker 214. Other input mechanisms may be used to input data to mobile computing device 101 that are not shown in FIG. 2, such as display 215 having touch-screen capability and keyboard 212 being a virtual keyboard. Mobile computing device 101 of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, each user of a mobile computing device may have knowledge of the amount of data that his/her device consumed and be able to "throttle" or reduce the utilization of data by an application(s) running on the user's device thereby attempting to not use more data than allotted. However, in the shared data plan context, the user may have no knowledge of the amount of data consumed by the other devices in the shared data plan. Hence, another device in the shared data plan could consume an amount of data that would cause the total data allocated across the devices in the shared data plan to exceed the total allotted data, or even consume the entire allocation of the shared data by itself, outside the sphere of knowledge of the other users in the shared data plan. Some mobile network operators provide the ability for the user to obtain a report regarding the shared data usage. However, such a report does not provide the real-time amount of data used by the devices in the shared data plan. For example, the report may indicate the data usage as of the last business day. Furthermore, in order to access such a report, the user has to log-in to the mobile network operator's website which is time consuming. Hence, there is not currently a means for the user to have access to real-time data usage among the mobile computing devices that share a data plan in an effortless manner thereby providing an opportunity to avoid unnecessary fees by taking actions to prevent the total allotted data to be used among the mobile computing devices that share a data plan from being exceeded.

Figure 3A:
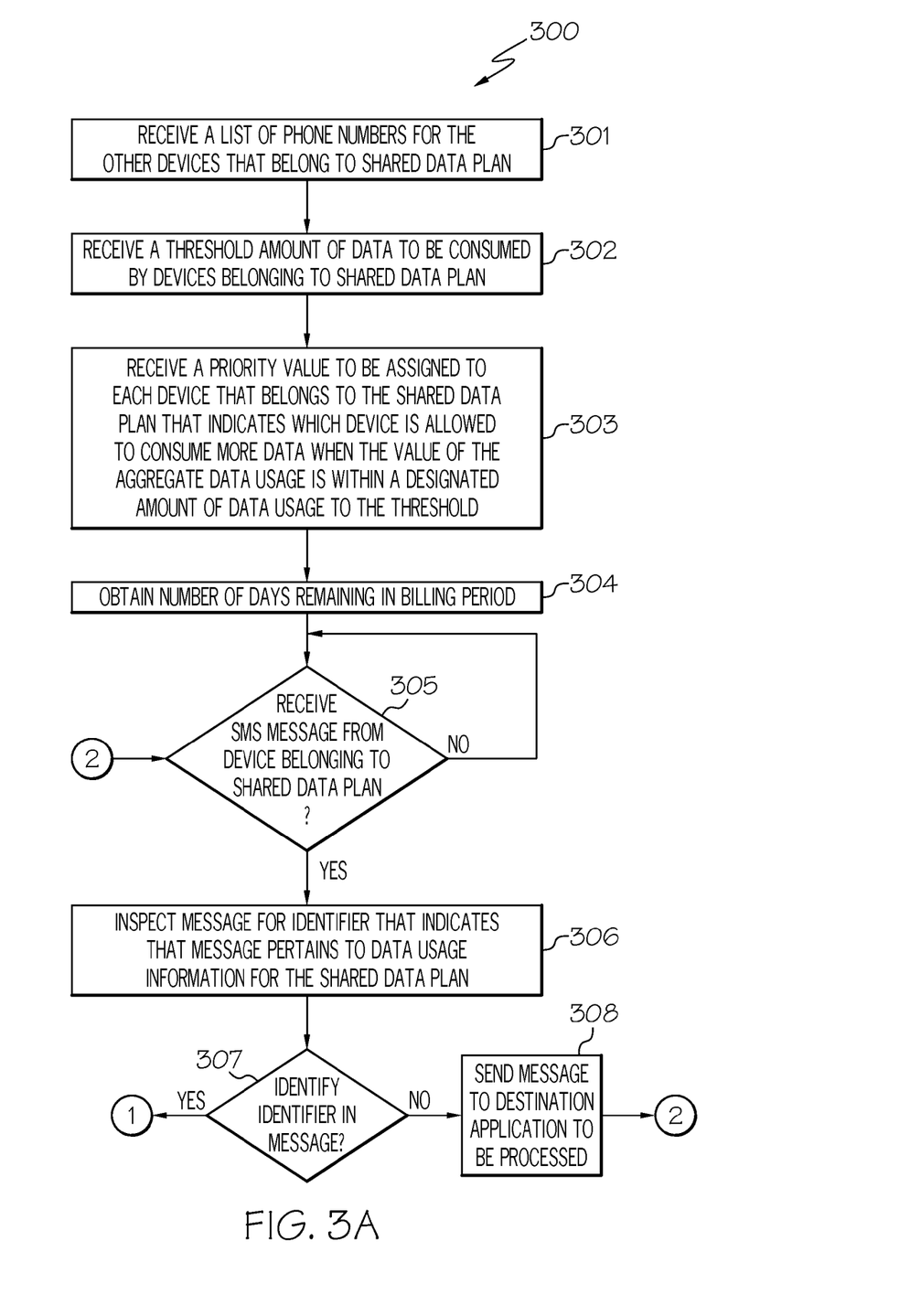
FIGS. 3A-3B are a flowchart of a method for enabling mobile computing devices to track data usage among mobile computing devices that belong to a shared data plan.
Figure 3B:
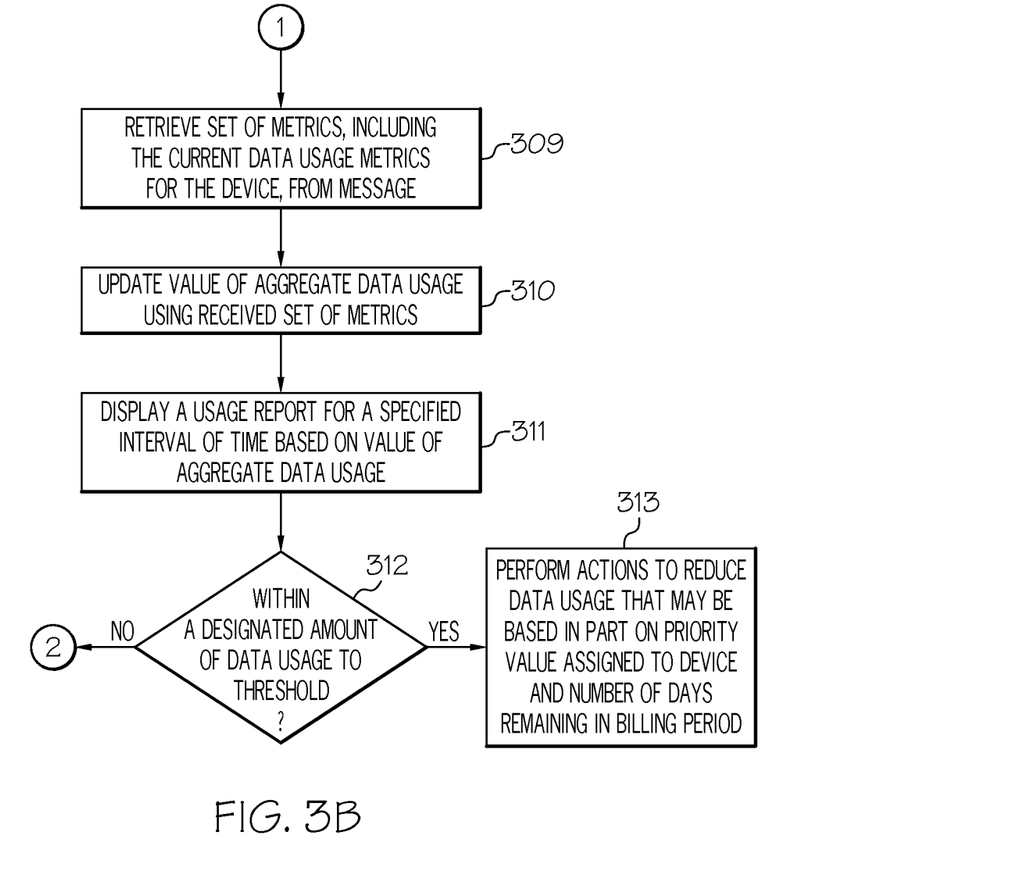
Figure 4:
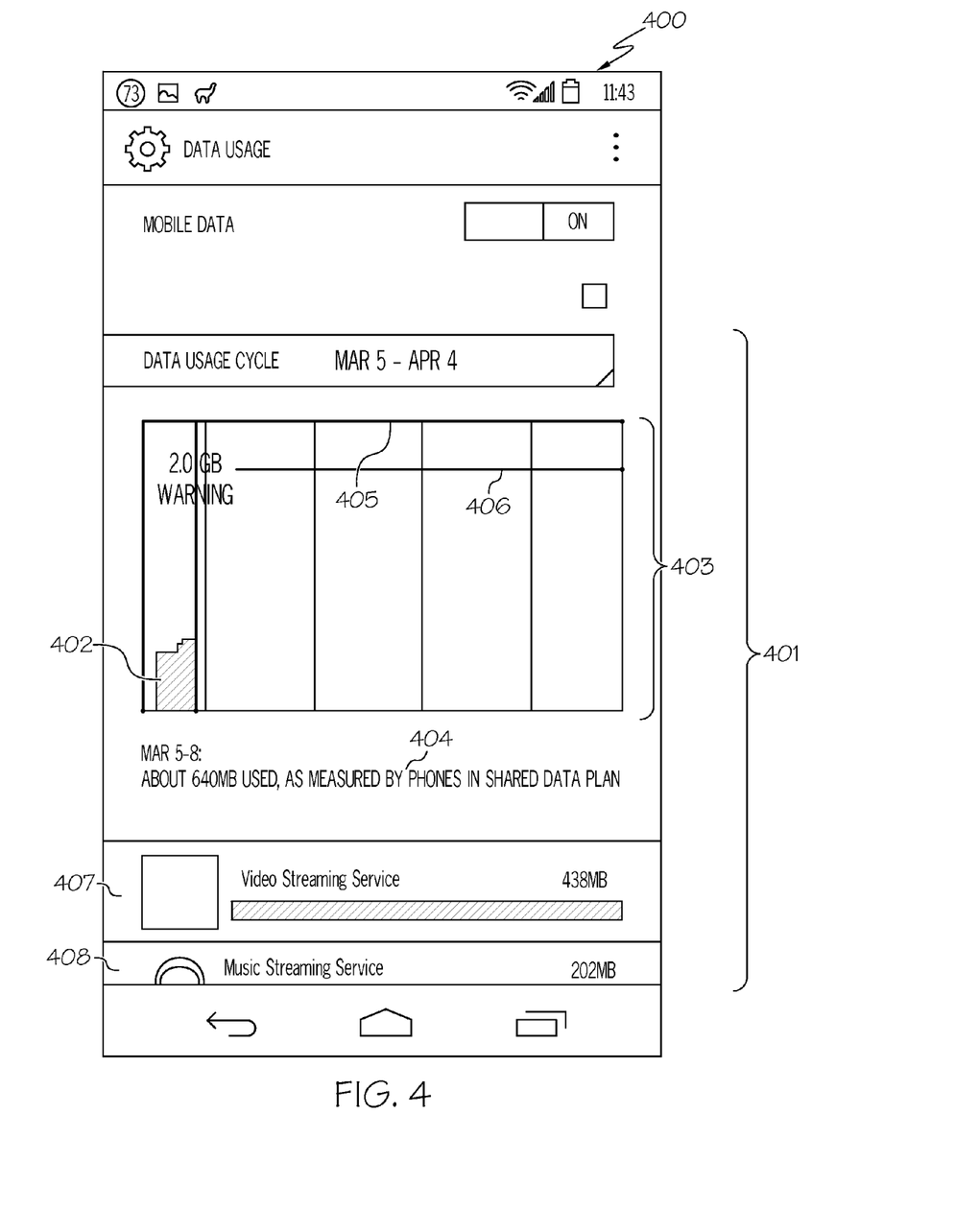
FIG. 4 is a screenshot of a user interface of a mobile computing device displaying the data usage report for a specified interval of time based on the value of the aggregate data usage.

The principles of the present invention provide a means for tracking data usage in an ad hoc manner among mobile computing devices that share a data plan thereby providing an opportunity to perform actions to reduce data usage when the data used by mobile computing devices that share the data plan is approaching the plan's allotted data usage as discussed below in connection with FIGS. 3A-3B and 4. FIGS. 3A-3B are a flowchart of a method for enabling mobile computing devices 101 (FIG. 1) to track data usage among mobile computing devices 101 (e.g., mobile computing devices 101A-101C) that belong to a shared data plan. FIG. 4 is a screenshot of a user interface of a mobile computing device 101 displaying the data usage report for a specified interval of time based on the value of the aggregate data usage.

As discussed above, FIGS. 3A-3B are a flowchart of a method 300 for enabling mobile computing devices 101 (FIG. 1) to track data usage among mobile computing devices 101 (e.g., mobile computing devices 101A-101C) that belong to a shared data plan in accordance with an embodiment of the present invention.

Prior to discussing the steps of method 300, it is noted that the steps of method 300 are to be implemented by each of the mobile computing devices 101 that belong to the shared data plan. For example, as discussed below, each mobile computing device 101 will receive the phone numbers for the other mobile computing devices 101 that belong to the shared data plan, receive the threshold amount of data to be consumed by mobile computing devices 101 belonging to the shared data plan, receive the priority values to be assigned to mobile computing devices 101 belonging to the shared data plan and obtain the number of days remaining in a billing a period.

Referring to FIG. 3A, in conjunction with FIGS. 1-2, in step 301, data usage tracker 104 for a particular mobile computing device 101 (e.g., mobile computing device 101A) receives a list of phone numbers for the other mobile computing devices 101 (e.g., mobile computing devices 101B, 101C) that belong to a shared data plan. For example, mobile computing devices 101A-101C may all belong to a shared data plan provided by a mobile network operator (provider of wireless communication services to mobile computing devices 101 via network 103), whereby the shared data plan involves an amount of data (e.g., 10 gigabytes of data) to be shared among mobile computing devices 101A-101C. In one embodiment, a user of mobile computing device 101 (e.g., mobile computing device 101A) may input the phone numbers of the other mobile computing devices 101 (e.g., mobile computing devices 101B, 101C) that belong to the shared data plan via keyboard 212.

In step 302, data usage tracker 104 for a particular mobile computing device 101 (e.g., mobile computing device 101A) receives a threshold amount of data to be consumed by mobile computing devices 101 belonging to the shared data plan. For example, if the shared data plan is 10 gigabytes of data to be shared among mobile computing devices 101A-101C for $100/month, then the threshold amount of data to be consumed by mobile computing devices 101 belonging to the shared data plan would be 10 gigabytes. Hence, the threshold amount of data to be consumed refers to the allotted amount of data to be consumed over a particular period of time (e.g., a month, billing period) by the mobile network operator. In one embodiment, a user of mobile computing device 101 (e.g., mobile computing device 101A) may input the threshold amount of data to be consumed by mobile computing devices 101 belonging to the shared data plan via keyboard 212.

In step 303, data usage tracker 104 for a particular mobile computing device 101 (e.g., mobile computing device 101A) receives a priority value to be assigned to each mobile computing device 101 (e.g., mobile computing devices 101A-101C) that belongs to the shared data plan that indicates which mobile computing device 101 (e.g., mobile computing device 101A) is allowed to consume more data when the value of the aggregate data usage (the total amount of data used by mobile computing devices 101 belonging to the shared data plan for a particular period of time) is within a designated amount of data usage to the threshold received in step 302. For example, priority values may range from a value of "1" to a value of "3," where a value of "1" indicates a highest priority and a value of "3" indicates a lowest priority. Mobile computing devices 101 assigned with a higher priority in comparison to the other mobile computing devices 101 (e.g., a parent's mobile computing device 101 may be assigned a higher priority over a child's mobile computing device 101) would be allowed to consume an additional percentage of data as compared to those mobile computing devices 101 with a lower priority when the data used by mobile computing devices 101 that share the data plan is approaching the plan's allotted data usage as discussed further below. In one embodiment, a user of mobile computing device 101 (e.g., mobile computing device 101A) may input the priority values to be assigned to mobile computing devices 101 belonging to the shared data plan via keyboard 212.

In step 304, data usage tracker 104 for a particular mobile computing device 101 (e.g., mobile computing device 101A) obtains the number of days remaining in a billing period. Such information may be used to determine the amount of data usage to be throttled so as to not exceed the plan's allotted data usage as discussed further below.

In step 305, a determination is made by data usage tracker 104 for a particular mobile computing device 101 (e.g., mobile computing device 101A) as to whether it received a message, such as an SMS message, from a mobile computing device 101 (e.g., mobile computing device 101B) belonging to the shared data plan.

If data usage tracker 104 for a particular mobile computing device 101 did not receive a message from a mobile computing device 101 (e.g., mobile computing device 101B) belonging to the shared data plan, then data usage tracker 104 continues to determine whether it received a message, such as an SMS message, from a mobile computing device 101 (e.g., mobile computing device 101B) belonging to the shared data plan in step 305.

If, however, data usage tracker 104 for a particular mobile computing device 101 receives a message, such as an SMS message, from a mobile computing device 101 (e.g., mobile computing device 101B) belonging to the shared data plan then, in step 306, data usage tracker 104 inspects the message for an identifier that indicates that the message pertains to data usage information for the shared data plan from a mobile computing device 101 (e.g., mobile computing device 101B) that belongs to the shared data plan. For example, the identifier may be a hash of all the phone numbers belonging to mobile computing devices 101 that belong to the shared data plan. In this manner, data usage tracker 104 will be able to determine that the message pertains to data usage information for the shared data plan from a mobile computing device 101 (e.g., mobile computing device 101B) that belongs to the shared data plan. Furthermore, by utilizing the hash of all the phone numbers as corresponding to the identifier, only those mobile computing devices that belong to the same shared data plan will have the same phone numbers thereby being able to calculate the same and correct hash.

Additionally, in one embodiment, messages pertaining to the data usage information for the shared data plan may be sent on a regular interval by mobile computing device 101 to the other mobile computing devices 101 belonging to the shared data plan. In this manner, as discussed in further detail below, each mobile computing device 101 belonging to the shared data plan will be able to track the total data used among mobile computing devices 101 belonging to the shared data plan. Furthermore, in this manner, messages with the identifier will be processed by data usage tracker 104 at the operating system level and not passed to higher level applications, such as SMS client applications. That is, the message will be handled internally by operating system 203. If, however, the message does not have an identifier, then it will be processed by the destination application, such as an SMS client application, as discussed further below.

In step 307, a determination is made by data usage tracker 104 for a particular mobile computing device 101 as to whether it identified the identifier in the message.

If data usage tracker 104 did not identify the identifier in the message, then, in step 308, data usage tracker 104 sends the message to the destination application (e.g., SMS client application) to be processed. Upon sending the message to the destination application to be processed, data usage tracker 104 determines whether it received a message, such as an SMS message, from a mobile computing device 101 (e.g., mobile computing device 101B) belonging to the shared data plan in step 305.

Referring now to FIG. 3B, in conjunction with FIGS. 1-2, if, however, data usage tracker 104 identified the identifier in the message, then, in step 309, data usage tracker 104 for a particular mobile computing device 101 (e.g., mobile computing device 101A) retrieves a set of metrics from the message that includes the current data usage metrics for mobile computing device 101 (e.g., mobile computing device 101B) that sent the message.

For example, the current data usage metrics may indicate that mobile computing device 101 (e.g., mobile computing device 101B) utilized 1 gigabyte of data since the start of the month, such as the start of the billing period. In another example, the current data usage metrics may indicate that mobile computing device 101 (e.g., mobile computing device 101B) utilized 100 megabytes of data since the last message sent by mobile computing device 101 (e.g., mobile computing device 101B) regarding data usage for the shared data plan. In one embodiment, the current data usage metrics may be represented by an application-by-application breakdown of data usage.

In step 310, data usage tracker 104 for a particular mobile computing device 101 (e.g., mobile computing device 101A) updates the value of the aggregate data usage using the received set of metrics. "Aggregate data usage," as used herein, refers to the total amount of data used by mobile computing devices 101 belonging to the shared data plan for a particular period of time (e.g., billing period). In this manner, mobile computing device 101 will be able to track the total data used among mobile computing devices 101 belonging to the shared data plan.

In step 311, data usage tracker 104 for a particular mobile computing device 101 (e.g., mobile computing device 101A) displays a usage report for a specified interval (e.g., billing period) based on the value of the aggregate data usage as illustrated in FIG. 4.

FIG. 4 is a screenshot of a user interface 400 of a mobile computing device 101 displaying the data usage report 401 for a specified interval of time (e.g., billing cycle) based on the value of the aggregate data usage in accordance with an embodiment of the present invention.

Referring to FIG. 4, data usage report 401 indicates that 640 megabytes (corresponding to the aggregate data usage) has been consumed by mobile computing devices 101 belonging to the shared data plan between March 5-8 during the data usage cycle/billing cycle of March 5-April 4 via line 402 in graph 403 as well as textually 404. Graph 403 also includes a line 405 indicating the threshold amount of data (received in step 302) to be consumed over a particular period of time (e.g., a month, billing period) by mobile computing devices 101 belonging to the shared data plan established by the mobile network operator. Graph 403 further includes a line 406 indicating an amount of data usage (e.g., 2 gigabytes) that triggers a "warning" that the threshold level (line 405) is approaching. The "warning" level 406 corresponds to a designated amount of data usage (e.g., 200 megabytes) prior to reaching the threshold amount of data (e.g., 2.2 gigabytes) to be consumed over a particular period of time (e.g., a month, billing period) by mobile computing devices 101 belonging to the shared data plan. When the "warning" level 406 is reached, appropriate actions may be taken to reduce data usage as discussed further below. In one embodiment, the "warning" level 406 may dynamically adjust during the period of time (e.g., billing period) based on the current day in the billing period. For example, warning level 406 may be at a lower level during the earlier part of the billing period than towards the end of the billing period to ensure that there will be sufficient data available to be utilized in the shared plan for the remainder of the billing period. Furthermore, in one embodiment, the "warning" level 406 may take into consideration the priority value assigned to mobile computing device 101 thereby corresponding to a different level of data usage for different mobile computing devices 101. For example, warning level 406 for a mobile computing device 101 assigned a high priority may be higher than for a mobile computing device 101 assigned a low priority thereby allowing that mobile computing device 101 to continue to consume data without throttling data usage for a period of time.

As also illustrated in FIG. 4, data usage report 401 further includes a breakdown of the aggregate data usage by application. For example, the 640 megabytes of data consumed by mobile computing devices 101 belonging to the shared data plan was consumed by the video streaming service application 407 (application consumed 438 megabytes of data) and the music streaming service application 408 (application consumed 202 megabytes of data) utilized by mobile computing devices 101 belonging to the shared data plan.

In one embodiment, data usage report 401 may include a breakdown of the aggregate data usage by each mobile computing device 101 belonging to the shared data plan as well as further indicating the amounts of data consumed by which applications in each mobile computing device 101 in the shared data plan.

Returning now to FIG. 3B, in conjunction with FIGS. 1-2 and 4, in step 312, a determination is made by data usage tracker 104 for a particular mobile computing device 101 (e.g., mobile computing device 101A) as to whether the aggregate data usage is within a designated amount of data usage (e.g., 200 megabytes) to the threshold amount of data (e.g., 2 gigabytes) to be consumed by mobile computing devices 101 belonging to the shared data plan. For example, a determination is made by data usage tracker 104 for a particular mobile computing device 101 (e.g., mobile computing device 101A) as to whether warning level 406 has been reached.

If the aggregate data usage is not within the designated amount of data usage (e.g., 200 megabytes) to the threshold amount of data (e.g., 2 gigabytes) to be consumed by mobile computing devices 101 belonging to the shared data plan, then data usage tracker 104 waits to receive a further message, such as an SMS message, from a mobile computing device 101 (e.g., mobile computing device 101B) belonging to the shared data plan in step 305.

If, however, the aggregate data usage is within the designated amount of data usage (e.g., 200 megabytes) to the threshold amount of data (e.g., 2 gigabytes) to be consumed by mobile computing devices 101 belonging to the shared data plan, then, in step 313, data usage tracker 104 for a particular mobile computing device 101 (e.g., mobile computing device 101A) performs actions, such as throttling the data used by applications running on mobile computing device 101, to reduce the data usage. In this manner, the user of mobile computing device 101 will be able to reduce unnecessary fees by taking actions to reduce data usage to ensure that the allotted amount of data to be consumed over a particular period of time (e.g., a month, billing period) by mobile computing devices 101 belonging to the shared data plan is not exceeded. Such actions may be based, at least in part, on the priority value assigned to mobile computing device 101 (e.g., mobile computing device 101A). If mobile computing device (e.g., mobile computing device 101A) is assigned a higher priority than the other mobile computing devices 101 belonging to the shared data plan, then mobile computing device 101 may be allowed to consume an additional percentage of data as compared to those mobile computing devices 101 with a lower assigned priority thereby lessening the amount of data to be throttled in comparison to the other mobile computing devices 101. The other mobile computing devices 101 with a lower priority may then be throttling a greater amount of data in comparison to the mobile computing device 101 with a higher assigned priority. In another example, mobile computing devices 101 may have to throttle their data usage prior to other mobile computing devices 101 belonging to the shared data plan if they were assigned a lower priority thereby enabling those mobile computing devices 101 assigned a higher priority to continue to consume data without throttling data usage for a period of time.

Furthermore, such actions may be based, at least in part, on the number of days remaining in the billing period. For example, if the billing period was thirty days, and after the $10^{th}$ day, more than 33% of the allotted data usage was consumed, then data usage tracker 104 may be more aggressive in throttling data usage so that there would be sufficient data available to be utilized in the shared data plan for the remainder of the month.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for enabling computing devices to track data usage among computing devices that share a data plan, the computer program product comprising a computer readable storage medium having program code embodied therewith, the program code comprising the programming instructions for:
  receiving a threshold amount of data to be consumed by a plurality of devices belonging to said shared data plan;
  receiving a message from a first device of said plurality of devices belonging to said shared data plan;
  inspecting said message for an identifier that indicates that said message pertains to data usage information for said shared data plan;
  retrieving a set of metrics comprising a current data usage metrics from said message in response to identifying said identifier in said message from said first device;
  updating a value of aggregate data usage by said plurality of devices belonging to said shared data plan using said received set of metrics; and
  determining if said value of said aggregate data usage is within a designated amount of data usage to said threshold amount of data to be consumed by said plurality of devices belonging to said shared data plan.

2. The computer program product as recited in claim 1, wherein the program code further comprises the programming instructions for:
  receiving a list of phone numbers for one or more devices of said plurality of devices belonging to said shared data plan;
  wherein said identifier in said message comprises a hash value of phone numbers for said plurality of devices.

3. The computer program product as recited in claim 1, wherein the program code further comprises the programming instructions for:
  performing actions to reduce data usage in response to said value of said aggregate data usage being within said designated amount of data usage to said threshold amount of data to be consumed by said plurality of devices belonging to said shared data plan.

4. The computer program product as recited in claim 1, wherein the program code further comprises the programming instructions for:

receiving a priority value to be assigned to each device of said plurality of devices belonging to said shared data plan that indicates which device is allowed to consume more data when said value of said aggregate data usage is within said designated amount of data usage to said threshold amount of data to be consumed by said plurality of devices belonging to said shared data plan.

5. The computer program product as recited in claim 4, wherein the program code further comprises the programming instructions for:

performing actions by a second device of said plurality of devices belonging to said shared data plan to reduce data usage in response to said value of said aggregate data usage being within said designated amount of data usage to said threshold amount taking into consideration said priority value assigned to said second device.

6. The computer program product as recited in claim 4, wherein the program code further comprises the programming instructions for:

obtaining a number of days remaining in a billing period; and performing actions by a second device of said plurality of devices belonging to said shared data plan to reduce data usage in response to said value of said aggregate data usage being within said designated amount of data usage to said threshold amount taking into consideration said priority value assigned to said second device and said number of days remaining in said billing period.

7. The computer program product as recited in claim 1, wherein the program code further comprises the programming instructions for:

displaying a usage report for a specified interval of time based on said value of said aggregate data usage.

8. A system, comprising:

a memory unit for storing a computer program for enabling computing devices to track data usage among computing devices that share a data plan; and a processor coupled to the memory unit, wherein the processor is configured to execute the program instructions of the computer program comprising:

receiving a threshold amount of data to be consumed by a plurality of devices belonging to said shared data plan;

receiving a message from a first device of said plurality of devices belonging to said shared data plan;

inspecting said message for an identifier that indicates that said message pertains to data usage information for said shared data plan;

retrieving a set of metrics comprising a current data usage metrics from said message in response to identifying said identifier in said message from said first device;

updating a value of aggregate data usage by said plurality of devices belonging to said shared data plan using said received set of metrics; and determining if said value of said aggregate data usage is within a designated amount of data usage to said threshold amount of data to be consumed by said plurality of devices belonging to said shared data plan.

9. The system as recited in claim 8, wherein the program instructions of the computer program further comprises:

receiving a list of phone numbers for one or more devices of said plurality of devices belonging to said shared data plan;

wherein said identifier in said message comprises a hash value of phone numbers for said plurality of devices.

10. The system as recited in claim 8, wherein the program instructions of the computer program further comprises:

performing actions to reduce data usage in response to said value of said aggregate data usage being within said designated amount of data usage to said threshold amount of data to be consumed by said plurality of devices belonging to said shared data plan.

11. The system as recited in claim 8, wherein the program instructions of the computer program further comprises:

receiving a priority value to be assigned to each device of said plurality of devices belonging to said shared data plan that indicates which device is allowed to consume more data when said value of said aggregate data usage is within said designated amount of data usage to said threshold amount of data to be consumed by said plurality of devices belonging to said shared data plan.

12. The system as recited in claim 11, wherein the program instructions of the computer program further comprises:

performing actions by a second device of said plurality of devices belonging to said shared data plan to reduce data usage in response to said value of said aggregate data usage being within said designated amount of data usage to said threshold amount taking into consideration said priority value assigned to said second device.

13. The system as recited in claim 11, wherein the program instructions of the computer program further comprises:

obtaining a number of days remaining in a billing period; and performing actions by a second device of said plurality of devices belonging to said shared data plan to reduce data usage in response to said value of said aggregate data usage being within said designated amount of data usage to said threshold amount taking into consideration said priority value assigned to said second device and said number of days remaining in said billing period.

14. The system as recited in claim 8, wherein the program instructions of the computer program further comprises:

displaying a usage report for a specified interval of time based on said value of said aggregate data usage.

\* \* \* \* \*